(No Model.)
G. RUSSELL.
FORMING TUBE FOR PIPE WELDING MACHINES.
No. 313,837. Patented Mar. 10, 1885.
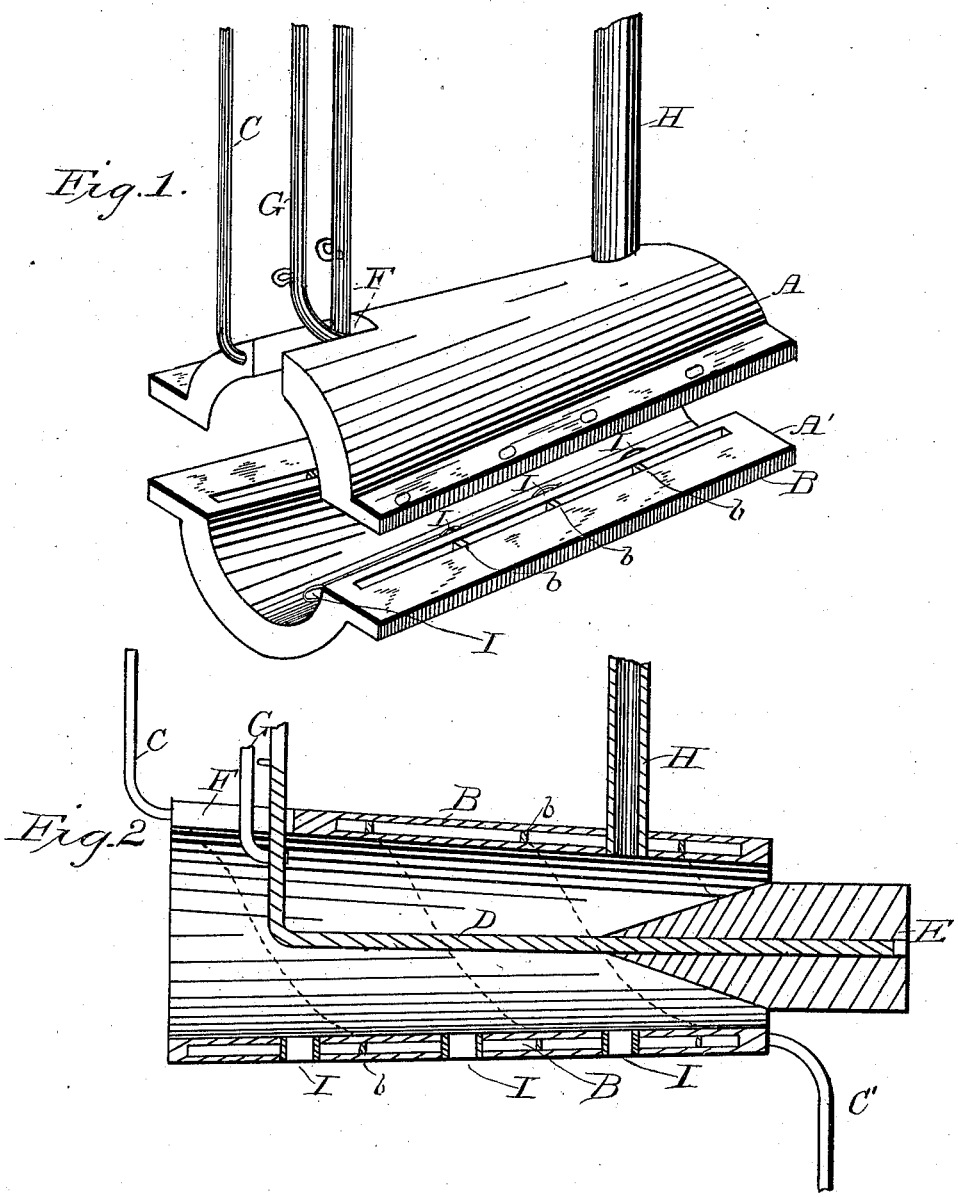
WITNESSES
Alva A. Moore
Wm. Musser
INVENTOR
George Russell
by Connolly Bros. and Ku Tighe
ATTORNEY

UNITED STATES PATENT OFFICE.

GEORGE RUSSELL, OF McKEESPORT, PENNSYLVANIA.

FORMING-TUBE FOR PIPE-WELDING MACHINES.

SPECIFICATION forming part of Letters Patent No. 313,837, dated March 10, 1885.

Application filed July 1, 1884. (No model.)

*To all whom it may concern:*

Be it known that I, GEORGE RUSSELL, of McKeesport, in the county of Allegheny and State of Pennsylvania, have invented certain new and useful Improvements in Method of and Apparatus for Manufacturing Pipe; and I do hereby declare that the following is a full, clear, and exact description of the invention, which will enable others skilled in the art to which it appertains to make and use the same, reference being had to the accompanying drawings, which form a part of this specification.

In an application of myself and D. Rush Wood, filed May 26, 1884, No. 132,801, for improvements in pipe-machines, we have shown and described a tube of tapering form, which is placed between the welding and forming rolls, and is called the "welding and forming tube." We have found that there is danger of the blank cooling in said tube, or in its passage therethrough, to such an extent as to prevent a perfect welding of the joint.

My present invention has relation to pipe-machines of that class wherein a forming and guiding tube is employed in connection with a pair of welding-rolls and a welding-ball, and has for its object the provision of means for maintaining the blank at a sufficiently high heat during its passage through the rolls to form a perfect weld where it reaches the welding ball and rolls.

My invention consists, first, in the provision of a forming-tube for a pipe-welding machine, formed with double walls, through which water is made to flow, and the combination therewith of a pipe for carrying gas to the interior of said tube; secondly, in the peculiar construction, arrangement, and combination of parts, as hereinafter described and claimed.

Referring to the accompanying drawings, Figure 1 is a perspective view of my improved forming and welding tube, the two halves of which said tube is composed being separated so as to show their internal construction; and Fig. 2, a longitudinal section of the tube, its connections, and the welding-ball and rod. The tube is of substantially the same shape as the tube shown in the application before referred to—that is, in the form of a tapered cylinder made in two halves, which are secured together by bolts passing through lateral flanges. The welding-ball and its supporting-rod are also of substantially the same construction as those shown in the aforesaid application. As in the present invention the rod which supports the welding-ball is subjected to intense heat, I propose, when its size will permit, to make the said rod hollow and circulate water through it.

In the drawings, A A' designate, respectively, the upper and lower halves of the forming-tube. These halves are formed with double walls, leaving a water-space, B, all around, and in said space is formed a spiral partition, $b$. Water-pipes C C' open into said water-space at each end of the tube, and serve to convey water into and away from the same.

D designates the welding-ball supporting-rod, and E the welding-ball on the end thereof. Said rod passes up through a slot, F, in the top of the forming-tube, through which slot also passes a gas-pipe, G, whose end opens into the interior of said tube.

H designates a funnel or chimney, which is placed at or near the end of the tube A, and opens into the interior thereof, its function being to carry off the products of combustion of the gas from pipe G and prevent them from impinging against the welding-rolls. If desired, the chimney H may be connected with an exhaust-flue, so as to create a draft. Openings I I I are formed in the bottom of the lower section of the forming-tube for the purpose of allowing the scale from the blank to fall out of the tube as the blank is being formed.

Operation: As the blank is formed and passed through the forming-tube the flame from the gas, conveyed to the tube by pipe G, strikes against the edges of the blank and maintains them at a high heat, thereby insuring a perfect weld at the joint. The water flowing through the water-space in the tube prevents the latter from being burned out by the gas-flame. The products of combustion are carried off through the chimney H, thereby avoiding unnecessary heating of the welding-rolls, and the scale from the blank passes off through the holes I I I in the bottom of the tube. The gas-flame may, in order to prevent unnecessary heating of the tube, be ignited only when necessary to heat the blanks, being turned down meanwhile.

The advantages of the invention are that the pipe being kept always at a high heat the welding is accomplished with ease and dispatch.

Very large sizes of pipe may be made, for the reason that the forming-tube, being comparatively cool on the bottom, will not heat the pipe to such degree as to cause it to lose its proper shape.

The operation of forming and welding being effected at a single pass of the blank, and the reheating being accomplished while the pipe is being formed, there is considerable saving of time over any process necessitating the reheating of the blanks in a furnace before the welding operation.

Having fully described my invention, I claim—

1. In a pipe-welding machine, the combination, with a welding-tube having a surrounding water-space, of the spiral partition $b$, dividing said space, as and for the purpose set forth.

2. In a pipe-welding machine, the combination, with a forming-tube having a surrounding water-space and pipes for conveying water to and from said water-space, of a gas-pipe opening into the interior of said tube, substantially as described.

3. In a pipe-welding machine, the combination, with a forming-tube having a surrounding water-space and pipes for conveying water to and from said water-space, of a gas-pipe opening into the interior of said tube at or near the top thereof, and a chimney opening out of the top of said tube, substantially as described.

4. The combination of a tube, A, having water-space B, holes I I I for the passage of scale, and chimney H, with gas-pipe G, and welding-ball E, all constructed and arranged substantially as described, and for the purpose set forth.

In testimony that I claim the foregoing I have hereunto set my hand, in the presence of two witnesses, this 28th day of June, A. D. 1884.

GEORGE RUSSELL.

Witnesses:
JOS. B. CONNOLLY,
LOUIS MOESER.